(12) United States Patent
Ahyh et al.

(10) Patent No.: US 7,861,153 B2
(45) Date of Patent: Dec. 28, 2010

(54) SYSTEM AND METHOD FOR DOCUMENT CONSTRUCTION

(75) Inventors: Ahyh, Lebanon, TN (US); Ken K. Kerr, San Clemente, CA (US); George R. Smith, Encinitas, CA (US); Richard L. Hanson, Jr., Diamond Bar, CA (US); Gregg S. Janes, Carlsbad, CA (US); Dane A. Parker, Carlsbad, CA (US)

(73) Assignee: Advisys, Inc., Newport Beach, CA (US)

( * ) Notice: Subject to any disclaimer, the term of this patent is extended or adjusted under 35 U.S.C. 154(b) by 1034 days.

(21) Appl. No.: 11/243,494

(22) Filed: Oct. 3, 2005

(65) Prior Publication Data

US 2007/0079231 A1    Apr. 5, 2007

(51) Int. Cl.
    *G06F 17/21* (2006.01)
(52) U.S. Cl. ............... 715/229; 715/202; 715/209; 715/210; 715/272; 715/277
(58) Field of Classification Search .......... 715/200, 715/201, 202, 209, 210, 272, 277, 229
    See application file for complete search history.

(56) References Cited

U.S. PATENT DOCUMENTS

| | | | |
|---|---|---|---|
| 6,993,708 B1 * | 1/2006 | Gillig | 715/234 |
| 2002/0169803 A1 * | 11/2002 | Sampath et al. | 707/513 |
| 2003/0041303 A1 * | 2/2003 | Milton | 715/513 |
| 2003/0144982 A1 * | 7/2003 | Reulein et al. | 707/1 |
| 2004/0205452 A1 * | 10/2004 | Fitzsimons et al. | 715/500 |
| 2005/0149920 A1 * | 7/2005 | Patrizi et al. | 717/168 |
| 2005/0262437 A1 * | 11/2005 | Patterson et al. | 715/517 |
| 2006/0075337 A1 * | 4/2006 | Jones et al. | 715/530 |
| 2006/0101321 A1 * | 5/2006 | Friedrichowitz et al. | 715/500 |

OTHER PUBLICATIONS

Millhollon et al., "Microsoft Office Word 2003 Inside Out," Dec. 10, 2003, Microsft Press, pp. 403-404.*

* cited by examiner

*Primary Examiner*—Joshua D Campbell
(74) *Attorney, Agent, or Firm*—Knobbe, Martens, Olson & Bear, LLP

(57) ABSTRACT

A document construction and management system is described. In one embodiment, documents are assembled by combining one or more modules. In one embodiment, the modules are combined according to one or more construction rules. The modules can be provided to a number of subscribers, each subscriber having one or more users. Access to each of the modules can be controlled on a subscriber basis and/or on a user basis based on different users or user classes. When new modules or new versions of an existing module are added to the database of available modules, access to the new module or version can be restricted until the new modules or versions have been reviewed and accepted. During the review period, the previous version of the module is made available to users for construction of documents. In one embodiment, one or more access rules are used to control which modules are available to which users. In one embodiment, search rules are provided to facilitate searching for a desired module.

18 Claims, 14 Drawing Sheets

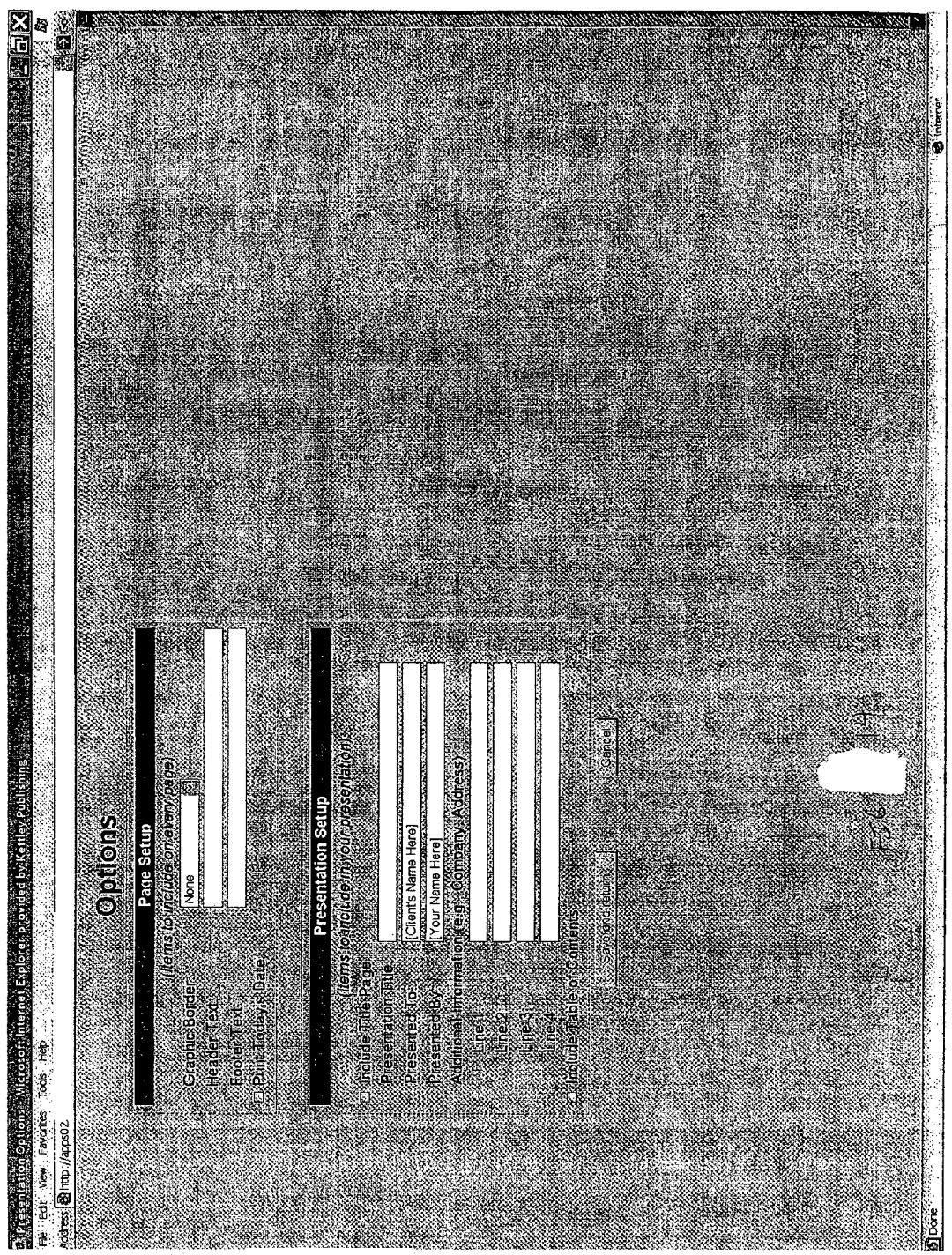

SYSTEM AND METHOD FOR DOCUMENT CONSTRUCTION

BACKGROUND

1. Field of the Invention

The present invention relates to systems and methods for generating documents from modular elements and for managing the modular elements.

2. Description of the Related Art

Many types of documents or document-like entities are generated by modular construction techniques in a manner not unlike that used for assembling mechanical devices. The document constructed from modular components can be source code for a software program, a Computer Aided Design (CAD) drawing, a text document, etc. For example, in many software systems, especially event-driven graphical user interface systems such as Microsoft Windows, much of the source code is repetitive and boiler-plate in nature. Thus, many software development systems provide for generation of source code by assembling various pieces of code, much in the same way than form paragraphs are often used to assemble a financial report or other text document. In a CAD environment, drawings of various pieces of an assembly are combined into a single document to produce a complete drawing of the desired assembly. In each of these cases, there is a need for quality control and pre-screening of the modules used to assemble the final document. Changes to existing modules are usually checked and verified before a new version of the module is made available to the users. Many software version control systems keep track of changes to the software, and provide a check-in check-out procedure such that only one person at a time can modify an module. In addition, most software version control systems also keep and audit trail of change to all for "rolling back" to a previous version of the software when a problem is discovered in a newer version. However, existing systems do not provide sufficient control over which users are allowed to access which modules and the existing systems do not provide sufficient control over how modules are assembled into documents.

SUMMARY

These and other problems are solved by a document management system that provides a multi-level access and assembly control. In one embodiment, documents are assembled by combining one or more modules. The modules can be provided to a number of subscribers, each subscriber having one or more users. Access to each of the modules can be controlled on a subscriber basis and/or on a user basis based on different user classes (e.g., supervisory user, first-level user, second-level user, public user, etc.).

When new modules or new versions of an existing module are added to the database of available modules, access to the new module or version can be restricted until such time as a supervisory user or other designated user has reviewed the new module of the changes to an existing module. During the review period, the previous version of the module is made available to users for construction of documents. In one embodiment, one or more access rules are used to control which modules are available to which users. In one embodiment, a different set of access rules can be provided for each subscriber, thus, allowing each subscriber to control access for the subscriber's user base.

In one embodiment, one or more search rules are configured to facilitate searching of the module database for a desired module. In one embodiment, the search rules are configured on a subscriber basis such that each subscriber can define a different set of search rules. In one embodiment, a database of default search rules is provided.

In one embodiment, one or more construction rules determine how various modules are combined during production of a document. In one embodiment, a user specifies an ordered list of modules to be used to construct a desired document. The construction rules are used by a construction engine to modify the user-supplied list to produce a document list as an ordered list of modules that will actually be used to construct the document. In one embodiment, the construction engine adds additional modules to the user-supplied list. In one embodiment, the construction list changes the order of the modules in the user-supplied list.

In one embodiment, the modules include software source code. In one embodiment, the modules include scripts in a scripting language (e.g., Basic, Lisp, Javascript, Perl, etc.). In one embodiment, the modules include CAD drawing files. In one embodiment, the modules include executable programs that construct a document or portions of a document. In one embodiment, the modules include XML code. In one embodiment, the modules include word-processing files. In one embodiment, the modules include text documents. In one embodiment, the modules include markup language files (e.g., HTML, SGML, Adobe Acrobat, Postscript, Encapsulated Postscript, etc.)

BRIEF DESCRIPTION OF THE DRAWINGS

FIG. 9 shows a sample screen for accepting or rejecting changes in a document control system for creating text documents.

FIG. 10 shows a sample screen for controlling user access to modules in the example system corresponding to FIG. 9.

FIG. 11 shows a first sample screen for controlling module search criteria in the example system corresponding to FIG. 9.

FIG. 14 shows a sample screen for selecting document options in the example system corresponding to FIG. 9.

DETAILED DESCRIPTION

Figure 1:
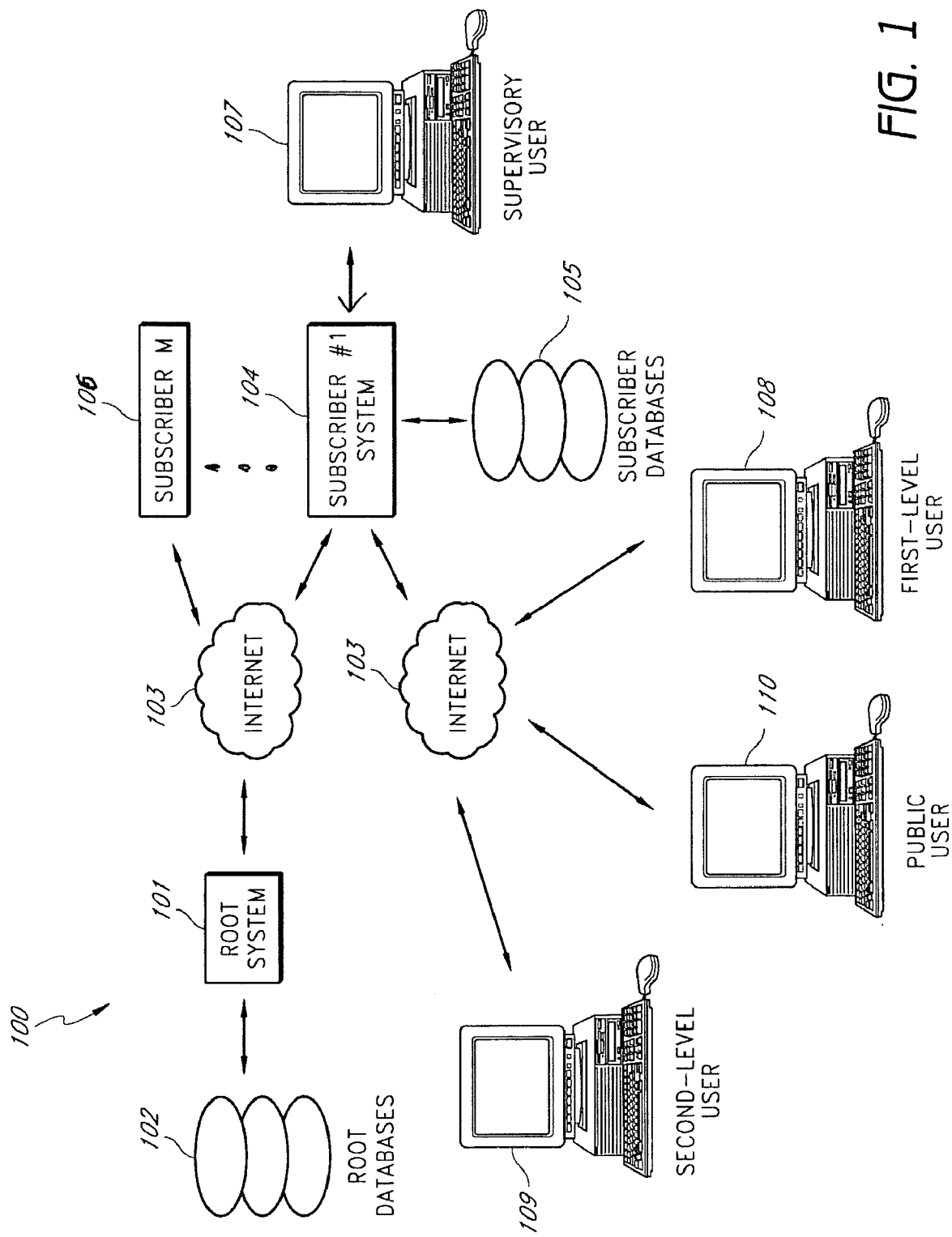
FIG. 1 shows a document construction system based on communication between a root system, one or more subscriber systems, and one or more user systems.

FIG. 1 shows a document construction system 100. In the system 100, a root system 101 communicates with a subscriber system 104. In FIG. 1, communication between the root system 101 and the subscriber system 104 is shown via the Internet 103, however, one of ordinary skill in the art will recognize that any other suitable local and/or wide area computer network connections can be used. One of ordinary skill in the art will further recognize that the root system 101 and the subscriber system 104 can be combined. In one embodiment, the root system 101 is also provided to one or more additional subscriber systems shown in FIG. 1 as an M-th subscriber system 105.

Using the Internet 103 (or other suitable network connection), the subscriber system 104 communicates with a first-level user system 108, a second-level user system 109, and a public user system 110. One or more root databases are provided to the root system 101, and one or more subscriber databases 105 are provided to the subscriber system 106. A supervisory user system 107 is provided to the subscriber system 104 by a local or Internet connection.

In the system 100, a user, such as the one or more of the users 108-109 can construct documents using data from the root databases 102 and/or the subscriber databases 105. In one embodiment, the documents are constructed as a collection of modules (as shown in FIG. 3) according to a hierarchy of access rules, search rules, and/or construction rules (as shown in FIG. 2).

Figure 2:
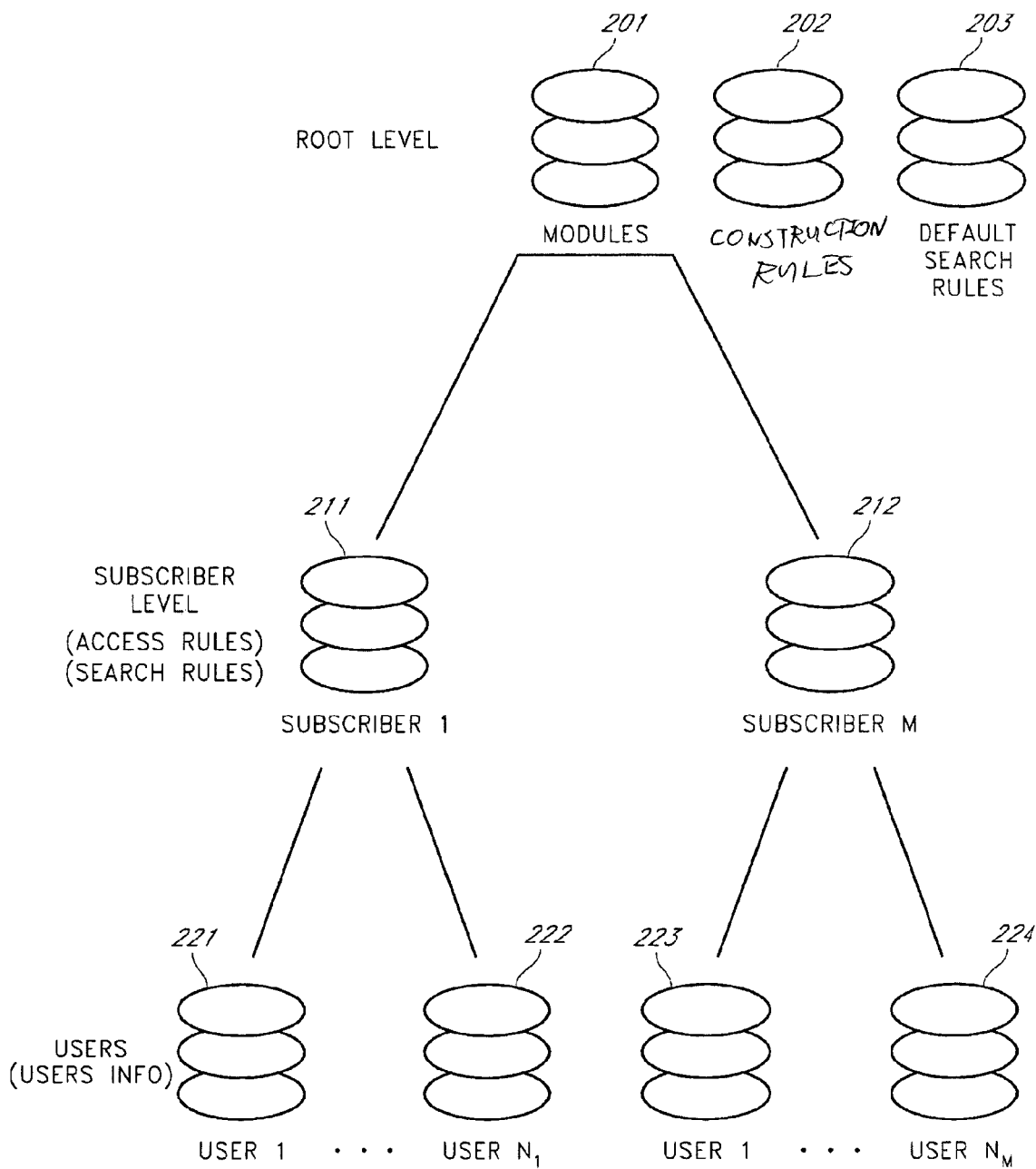
FIG. 2 shows one example of a data hierarchy in the document construction system, where the hierarchy includes a root level, a subscriber level, and a user level.

FIG. 2 shows one example of a data hierarchy that can be used in connection with the document construction system 100. In FIG. 2, the uppermost level of the hierarchy includes a module database 201 containing one or more modules, a construction rules database 202 containing one or more construction rules, and a search rule database 203 containing one or more default search rules. A second level of the hierarchy shown in FIG. 2 includes one or more subscriber databases, shown as a first subscriber database 211 and a second subscriber database 212. The Subscriber databases 211 and 212 contain subscriber-specific access rules and search rules. A third level of the hierarchy shown in FIG. 2 includes one or more user information databases 221-224. The user databases 221-222 correspond to users of the first subscriber 104, and the user databases 223-224 correspond to users of the M-th subscriber.

In one embodiment, the databases 201-203 and 211-212 are part of the root databases 102, and the user information databases 221-222 are part of the subscriber database 105. However, one of ordinary skill in the art will recognize that the information in the databases 201-203, 211-212, and 221-224 can be distributed between the root databases 102 and 105 as needed to meet performance, stability and/or data integrity needs. One of ordinary skill in the art will further recognize that the databases 201-203, 211-212, and 221-224 can be combined in whole or in part, and are described as separate databases for purposes of explanation and not by way of limitation.

Figure 3:
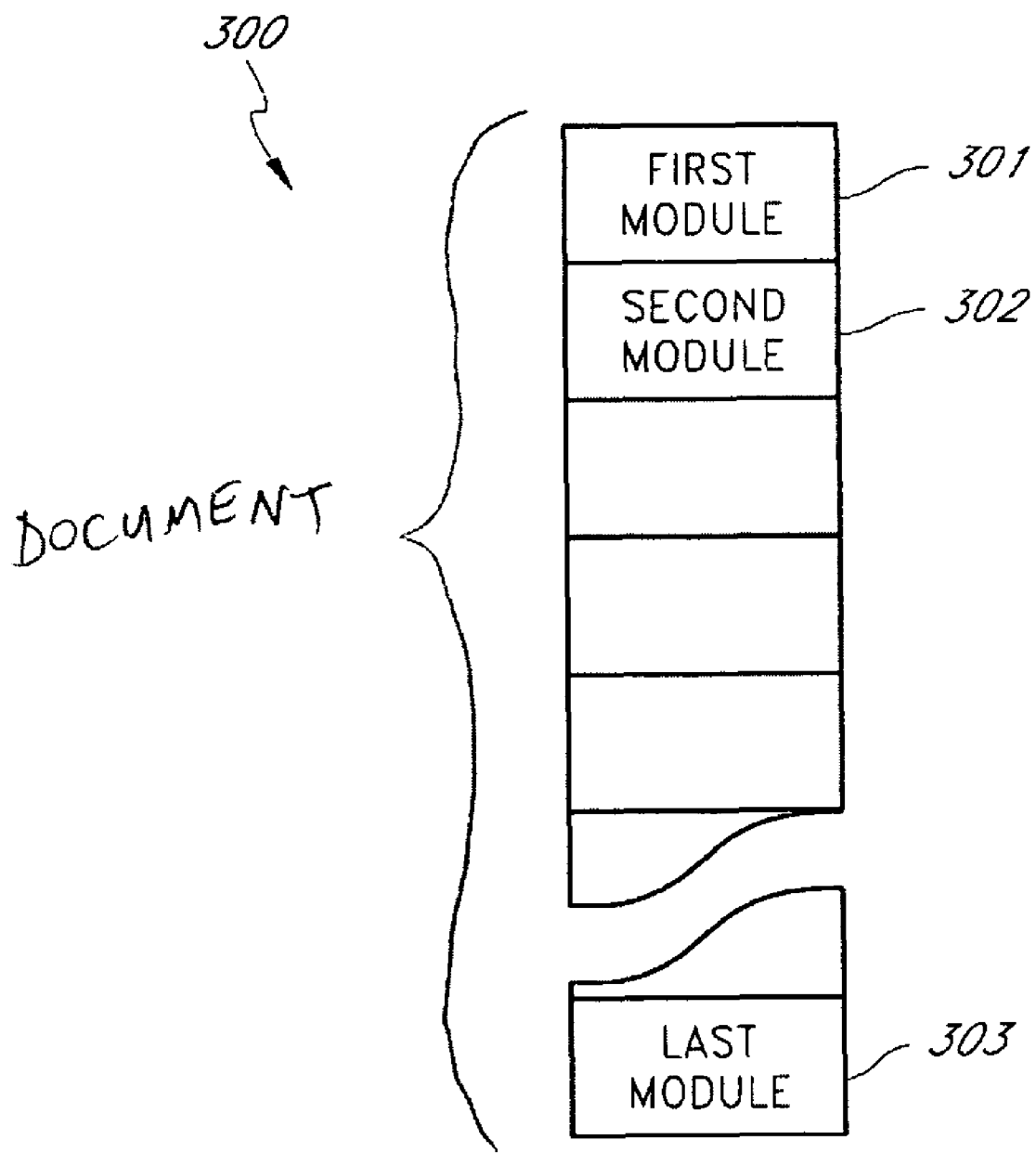
FIG. 3 shows a document constructed as an ordered list of modules.

FIG. 3 shows a document 300 constructed as an ordered list of modules, including a first module 301, a second module 302, and a last module 303. To construct a document, a user creates a user-selected list of one or more modules. The user-selected list is edited or modified according to one or more construction rules and then the document is constructed by instantiating the modules in the edited list. The process of document construction is described in more detail in the text in connection with FIGS. 7 and 8.

The modules 301-303 are obtained from the module database 201. Access to each of the modules can be controlled on a subscriber basis and/or on a user basis. User access can be restricted on a user-by-user basis (e.g., based on a user ID). User access can also be restricted based on different user classes (e.g., supervisory user, first-level user, second-level user, public user, etc.). User access can also be restricted based on different user authorization levels, licenses, job functions, etc. In one embodiment, one or more access rules are used to control which modules are available to which users. In one embodiment, a different set of access rules can be provided for each subscriber, thus, allowing each subscriber to control access for the subscriber's user base.

In one embodiment, the modules include software source code. In one embodiment, the modules include scripts in a scripting language (e.g., Basic, Lisp, Javascript, Perl, etc.). In one embodiment, the modules include CAD drawing files. In one embodiment, the modules include executable programs that construct a document or portions of a document. In one embodiment, the modules include XML code. In one embodiment, the modules include word-processing files. In one embodiment, the modules include text documents. In one embodiment, the modules include markup language files (e.g., HTML, SGML, etc.).

One of ordinary skill in the art will recognize that the type of data in the modules is a function of the type of document being produced. Thus, for example, if the system 100 is configured to produce a computer program, then the modules will typically contain source code, or scripts (or programs) to generate source code. Thus, in such a system, instantiation of each module produces zero or more lines of source code to be added to the document 300. By contrast, if the documents 300 is to be a CAD drawing, then the modules will typically contain CAD files, or scripts (or programs) to generate CAD files, and the CAD files generated will be combined to produce the CAD file document 300.

In one embodiment, the document 300 is a report produced in a markup language (e.g., HTML, SGML, Adobe Acrobat, Postscript, Encapsulated Postscript, etc.) containing text and/or graphics. Examples of reports include, for example, a web page, a program design document, a financial report, etc. The modules to produce a report can include, for example, markup language files, graphics files, template files, scripts, executable code, etc. Modules containing markup language can include, for example, form paragraphs, boilerplate language, standard text, standard headings, etc. Graphics files such as pictures, graphs, charts, and the like can be provided in a desired format (e.g., bitmap, jpeg, tiff, etc.). Template files can include markup language files with fields to be filled with user-supplied data during module instantiation (e.g., Name, address, etc.). Scripts and/or executable files can be configured to dynamically generate markup language content for the document 300.

In one embodiment, one or more search rules are configured to facilitate searching of the module database 201 for a desired module. In one embodiment, the search rules are configured on a subscriber basis such that each subscriber can define a different set of search rules. In one embodiment, the default search rule database 203 is provided and the default rules are modified for each subscriber according to the subscriber level databases 211-212. In one embodiment, the default search rule database 203 is omitted and the search rules are provided for each subscriber in the subscriber level databases 211-212.

Figure 4:
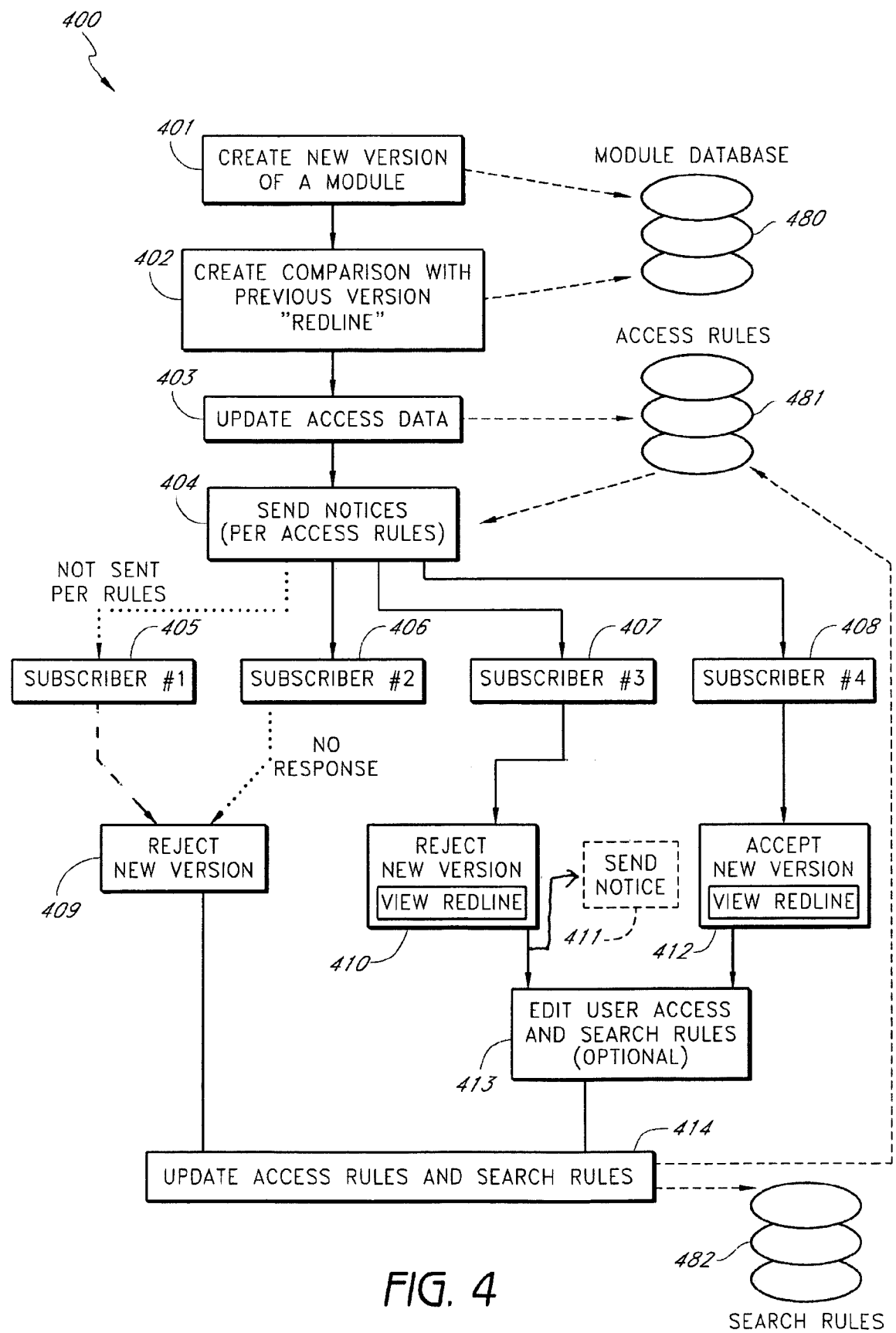
FIG. 4 is a flowchart showing a version control system wherein subscribers can accept or reject new modules and/or new versions of existing modules.

FIG. 4 is a flowchart 400 showing a version control system wherein subscribers can accept or reject new modules and/or new versions of existing modules. The flowchart 400 begins in a process block 401 where the new module or new version of an existing module is added to a module database 480. In one embodiment, when a new version of a module is added to the database 480, a process block 402 adds a "redline" copy to the database 480 showing substantive differences between the old and new versions of the module is also provided. In the case of text modules (e.g., markup text, language source text), the redline version can show substantive differences in the text. In the case of modules containing scripts or executable code, the redline can show differences in the script (or source code) and/or differences in the output produced by the script or executable. In one embodiment, the redline shows substantive differences between the old and new versions of the module but not minor differences (e.g., spelling corrections, corrections of punctuation, etc.).

After the module database is updated, the process advances to a process block 403 wherein an access rule database 481 for each subscriber is updated to indicate that a new module or new version of a module is available. A timestamp for the new version is also provided. The process then advances to a process block 404. In the process block 404, notices are sent to each subscriber informing the subscriber that a module has been added or updated. Notices are sent based on subscriber information obtained from the access rules database 481. If the updated module is not used by a particular subscriber, then no notice is sent. Thus, for example, in FIG. 4, no notice is sent to subscriber #1 based on information obtained from the access rules database 481 indicating that subscriber #1 does not use the updated module. In FIG. 4, notices are sent to a subscriber #2, a subscriber #3, and a subscriber #4 in process blocks 406-408, respectively.

If, after a specified acceptance period, no response is received from a subscriber (as shown, for example, for subscriber #2 in FIG. 4), then the new module or version is automatically rejected.

A subscriber can review and reject the new module or update (as shown, for example, for subscriber #3 in FIG. 4). In a process block 410, the subscriber #3 reviews the redline and decides to reject the new module or new version. In one embodiment, when a module or new version of a module is rejected, a message is sent to the module provider in a process block 411. After rejecting the module in the process block 410, the process advances to a process block 413 where the subscriber can (optionally) edit the user access and/or search rules for the module Alternatively, subscribers can also review and accept the new module or update (as shown, for example, for subscriber #4 in FIG. 4). In a process block 412, the subscriber #4 reviews the redline and decides to accept the new module or new version. The process then advances to the process block 413 where the subscriber can (optionally) edit the user access and/or search rules for the module The process advances from the process block 409 (default rejection) or the process block 413 (edit user access or search rules) to a process block 414 where the access rules database 481 and the search rules database 482 are updated to reflect the inputs from the subscriber.

Figure 5:
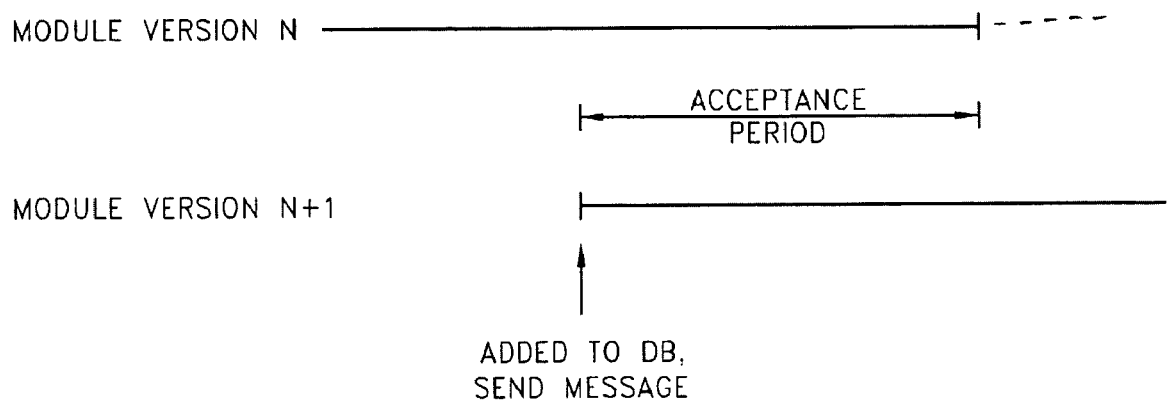
FIG. 5 shows one embodiment of an acceptance timeline for accepting new versions of an existing module.

During the review process shown in FIG. 4, the previous version of an updated module remains available to the users. When new modules or new versions of an existing module are added to the module database 480, user access to the new module or version can be restricted until such time as a supervisory user or other designated user has reviewed and accepted the new module. During the review period, the previous version of the module is made available to users for construction of documents. FIG. 5 shows one embodiment of a timeline for user access to new and previous versions of a module. In FIG. 5, the addition of a new version (version N+1) of a module to the module database 480 (corresponding to the process block 401 in FIG. 4) triggers the start of an acceptance period. During the acceptance period, the previous version (version N) of the module is available to the users.

Once a module has been accepted by a subscriber (e.g., subscriber #4 in FIG. 4), then the N+1 version becomes available to users of that subscriber and version N becomes unavailable to users of that subscriber. In one embodiment, the acceptance process is done on a subscriber-by-subscriber basis. Thus, during the acceptance period, users of one subscriber (who has not yet accepted the new version) will only have access to version N of the updated module, and users of a different subscriber (who has accepted the new version) will only have access to version N+1 of the updated module.

In one embodiment, the previous version of the module (version N) becomes unavailable to all users at the end of the acceptance period.

Figure 6:
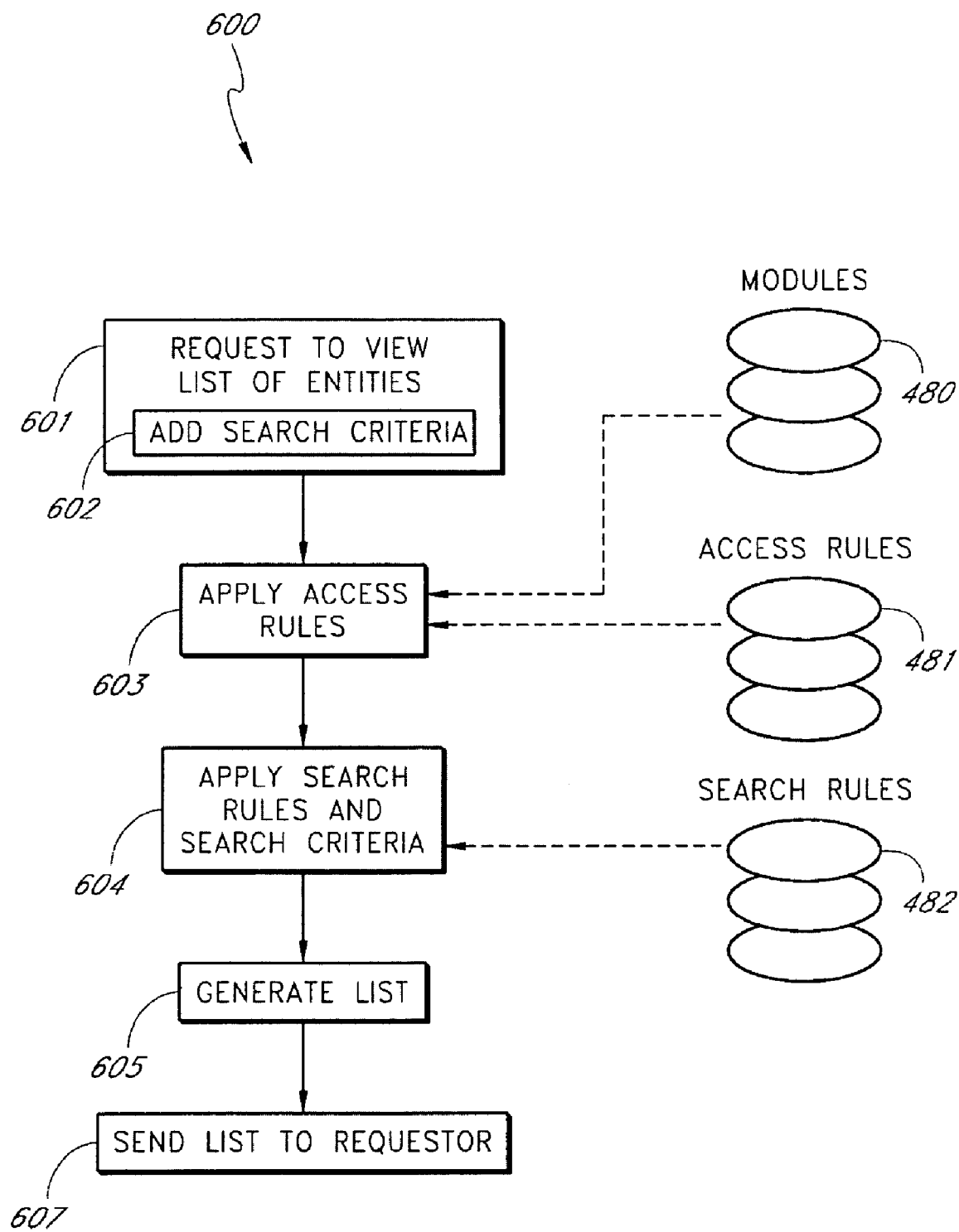
FIG. 6 is a flowchart showing construction of a list of available modules for a user, where access to various modules is based on a set of access rules and a set of search rules.

FIG. 6 is a flowchart showing a process 600 for construction of a list of available modules for a user. The process 600 begins in a process block 601 wherein a user requests a list of available modules. The user can request a list of all available modules or the user can add one or more search criteria 602 to be used in constructing the list. The process then advances to a process block 603. In the process block 603, the system accesses the list of available modules in the module database 480 and filters the list based on access rules obtained from the access rules database 481. The access rules are used, for example, to determine which version of a module the user's subscriber has accepted (e.g. version N or version N+1) and whether the user is allowed access to that module based on the user's access privileges. For example, in one embodiment, first-level users 108 (shown in FIG. 1) have access to more modules than second-level users 109, and second-level users have access to more modules than public users 110. The result of the process block 603 is a list of allowed modules.

The list of allowed modules is provided to a process block 604 where the list of allowed modules is filtered according to one or more search rules (from the search rule database 482) using the optional search criteria provided by the user. The result of the process block 604 is the list of modules. The list of modules is formatted in a process block 605 and then presented to the user in a process block 607.

Figure 7:
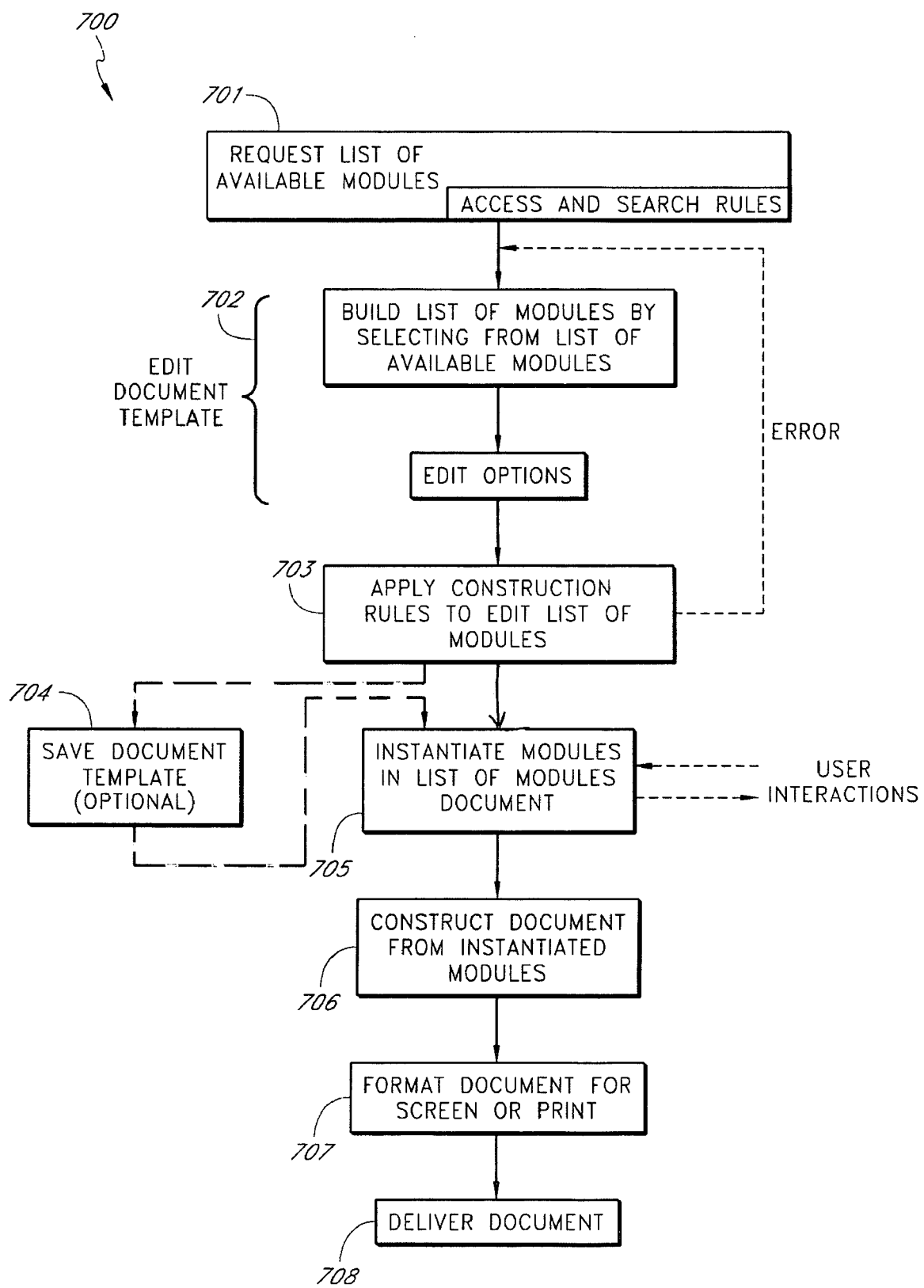
FIG. 7 is a flowchart showing document construction.

FIG. 7 is a flowchart showing a process 700 for document construction. The process 700 begins in a process block 701 where the user requests a list of available modules (as described in connection with FIG. 6). The process then advances to an edit loop 702 where the user can build and edit a document template. The document template includes a list of requested modules for the document (a request list), and various document options (e.g., fonts, page numbering options, language options, etc.). The user builds the request list by selecting modules from the list of available modules. The request list can be edited by adding new modules, deleting modules, changing the order of the list, etc.

Once the document template is complete, the request list is provided to a construction rules engine (in a process block 703) where the request list is edited according to one or more construction rules to produce the actual list of modules to be used in the document (a document list). In one embodiment, the construction rules define interactions between various modules and/or requirements based on various modules. The following are typical examples of construction rules (where the identifier M### is used to identify various modules):

Module M001 and module M002 cannot appear in the same document.

Module M003 requires module M004.

If Module M005 appears with module M006, then module M005 must precede module M006 in the document.

Module M007 is required in all documents.

Etc.

The output of the process block 703 is a document template that includes a document list and the document options. The document list is an ordered list of all the modules that will be used to construct the document. In one embodiment, the user can, optionally, save the document template for later recall.

The document template is then provided to a process block 705 where each module in the document list is instantiated. Some modules (e.g., modules that include scripts or executable code) can produce dialog boxes or other user input requests, and thus, the process of module instantiation typically involves some interaction with the user. The instantiated modules are then provided to a construction block 706 where the instantiated modules are assembled into a document. In one embodiment, the construction block also adds page numbering, borders, generates a table of contents, etc. In one embodiment, the assembled document is then provided to a process block 707 where the document is formatted for display on a screen or printer, etc. The formatted document is then delivered to the user.

Figure 8:
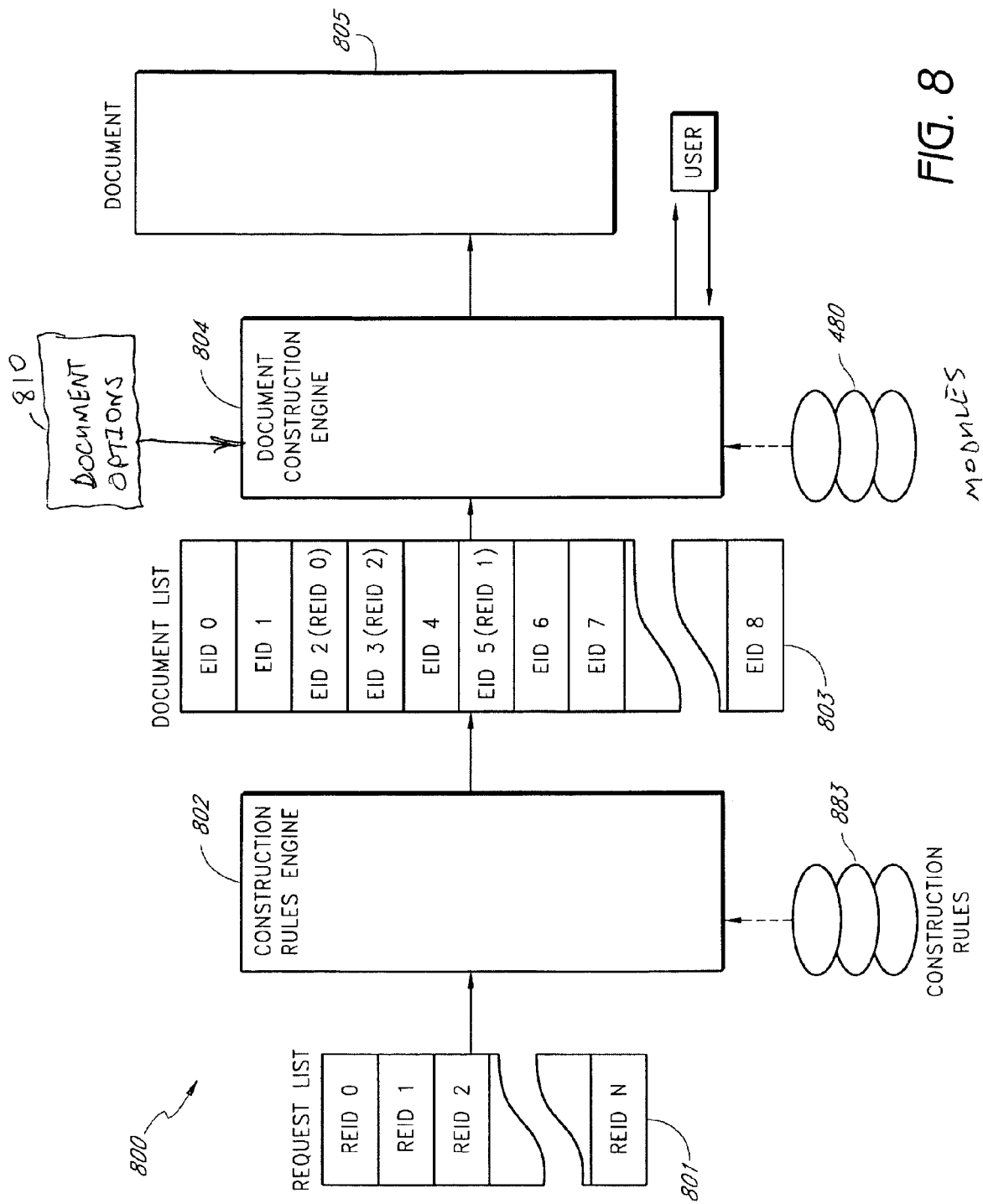
FIG. 8 is a data-flow diagram showing document construction.

FIG. 8 is a data-flow diagram of the document construction process shown in FIG. 7. In FIG. 8, a request list 801 and a database of construction rules 883 are provided to a construction rules engine 802 (corresponding to the process block 703 in FIG. 7). The output of the construction rules engine 883 is a document list 803. The document list 803, document options 810, and the module database 408 are provided to a document construction engine (corresponding to the process blocks 705 and 706 in FIG. 7). The output of the document construction engine 804 is the completed document.

As described above, the system described herein can be used to construct documents for many different purposes such as writing software, constructing CAD drawings, producing reports, etc. The samples shown in FIGS. 9-16 are provided for illustration to show one embodiment of the document control system. FIGS. 9-16 show sample screens from one example of the system 100 when used in connection with a system for generating documents for financial reports, estate planning, etc. In one embodiment of the system of FIGS. 9-16, the subscribers are insurance companies or other financial services companies, the supervisory users 107 are compliance monitors and other quality-assurance and risk-assessment personnel of the subscribers. The first-level users 108 are agents (e.g., insurance agents or financial services agents) and the second-level users 109 are clients. The agents (first-level users 108) use the system 100 via the screens shown in FIGS. 12-14 to construct financial reports for their clients 109. The supervisory users use the screens shown in FIGS. 9-11 to control the agent's access to the modules.

Figure 9:
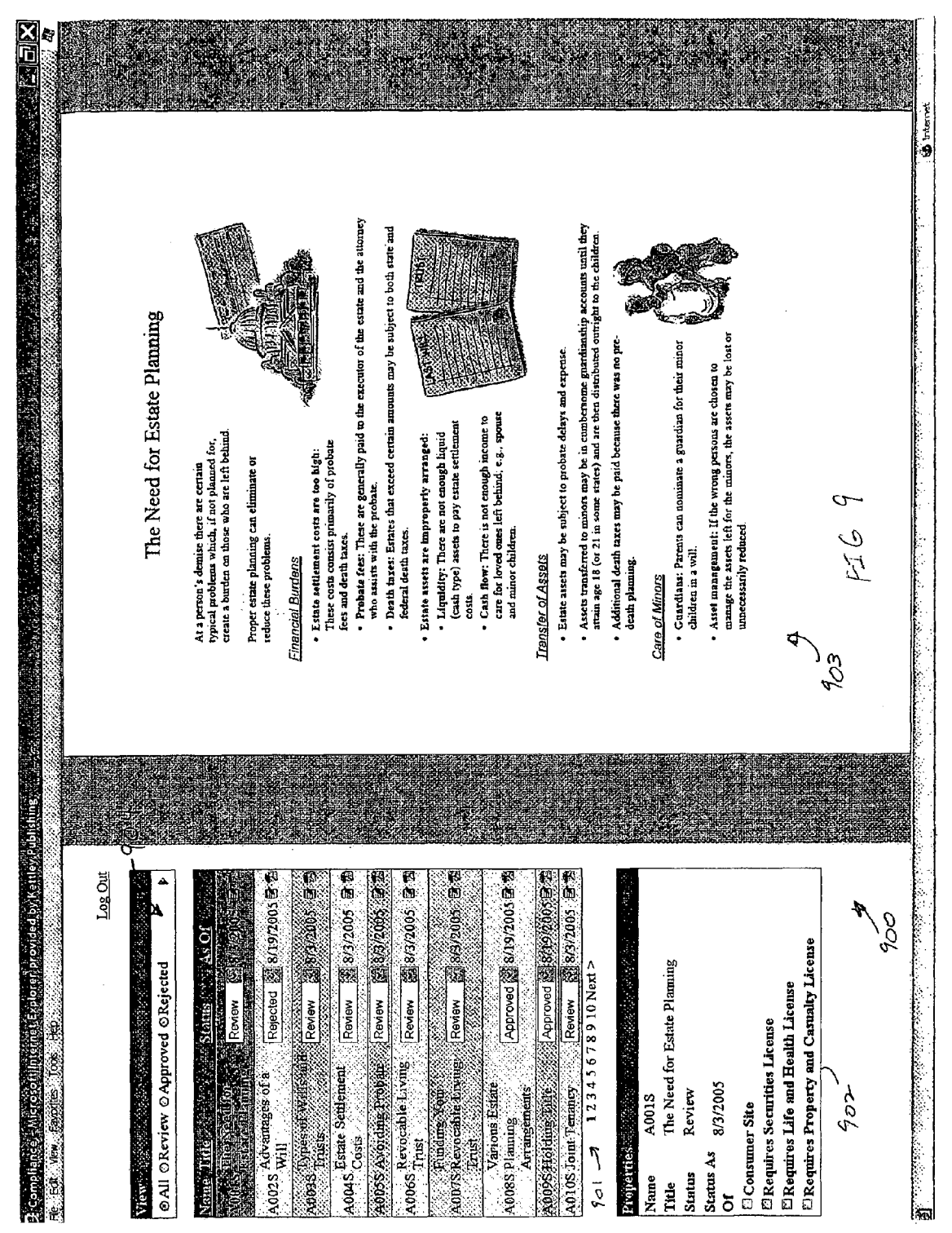

FIG. 9 shows a sample accept/reject screen 900 for accepting or rejecting changes in a document control system for creating documents for financial reports (e.g., estate planning, tax planning etc.). A list 901 lists modules that are currently being reviewed. Each line in the list 901 includes a module identifier (e.g., "A001S"), a module title or name (e.g., "the Need For Estate Planning"), a module status user input control (e.g., review, accept, reject), a date field indicating when the acceptance period started, a button to show the contents of the module and a button to show the contents of the redline in a display area 903. A user input control 904 allows the user to specify whether the 901 shows all modules, only those modules that need to be reviewed, only those modules that need to be approved, or only those modules that need to be rejected.

A control group 902 includes user input controls to specify user access controls for the currently-selected module (e.g., "Requires Securities License", "Requires Life and Health License", "Requires Property and Casualty License", etc.).

Figure 10:
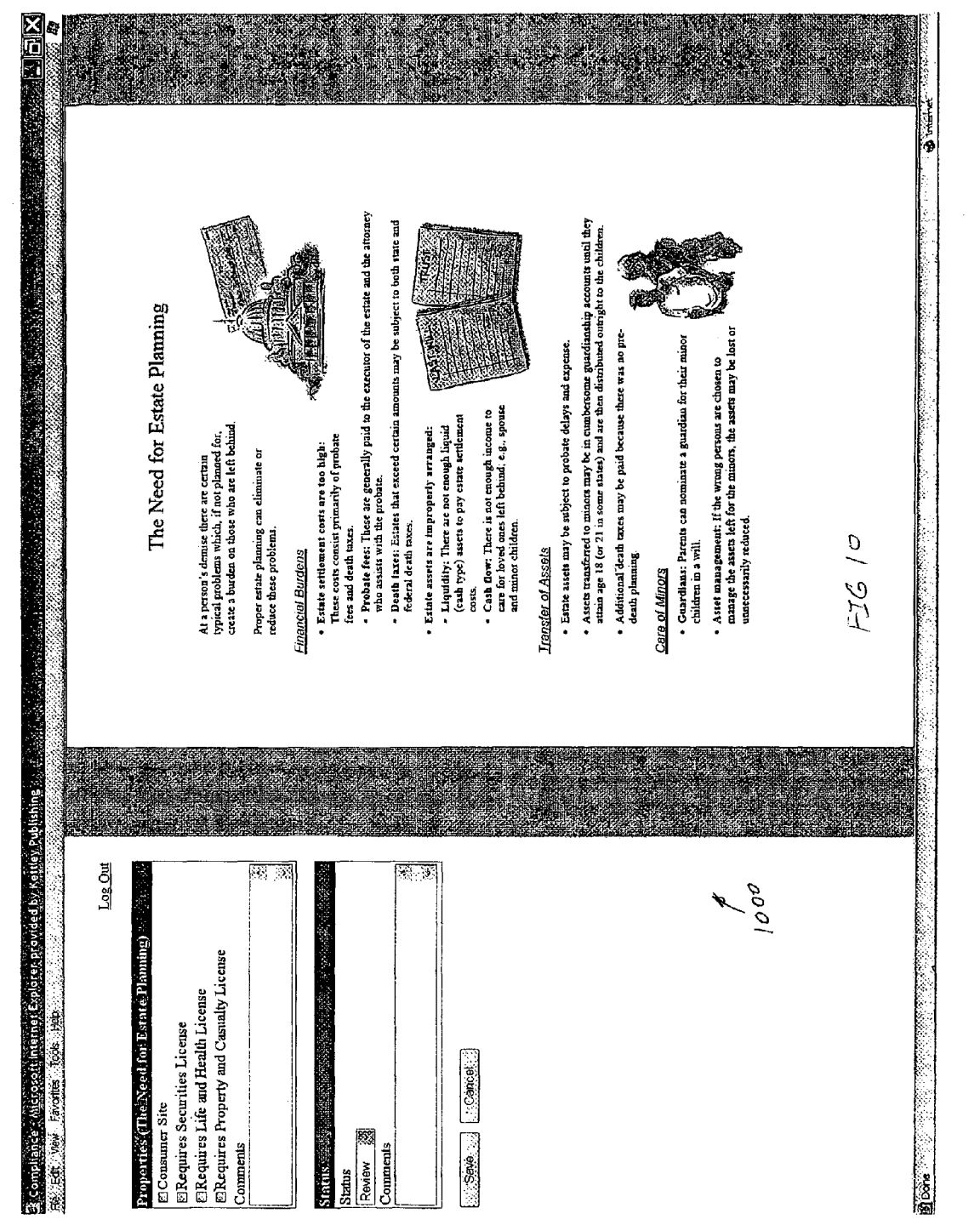

FIG. 10 shows a sample screen for controlling user access to modules in the example system corresponding to FIG. 9. The screen includes the user access controls and review/accept/reject control from FIG. 9, and in addition, includes comments fields for user access and status.

Figure 11:
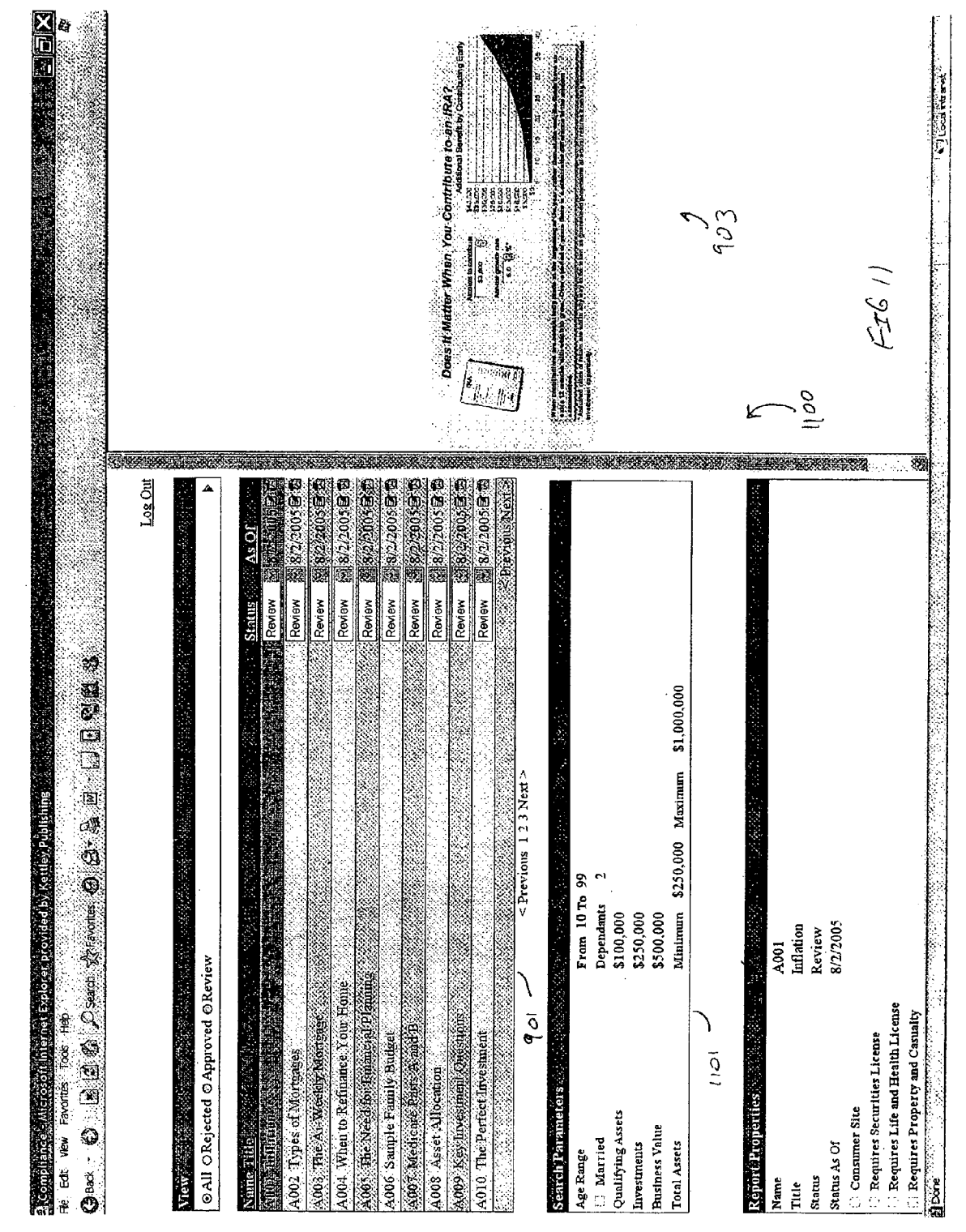

FIG. 11 shows a sample screen 1100 for defining and controlling search rules in the example system corresponding to FIG. 9. The screen 1100 includes the access controls 902, the preview area 903, and the list 901. The list 901 allows the user to select a module and the search rules for the selected module are shown in a dialog area 1101. In the dialog area 1101, the search rules for the selected module are displayed, and user edit controls are provided for editing the search rules. Typical search rules for financial reports include age range, marital status, dependants, qualifying assets, investments, business value, total assets, etc.

Figure 12:
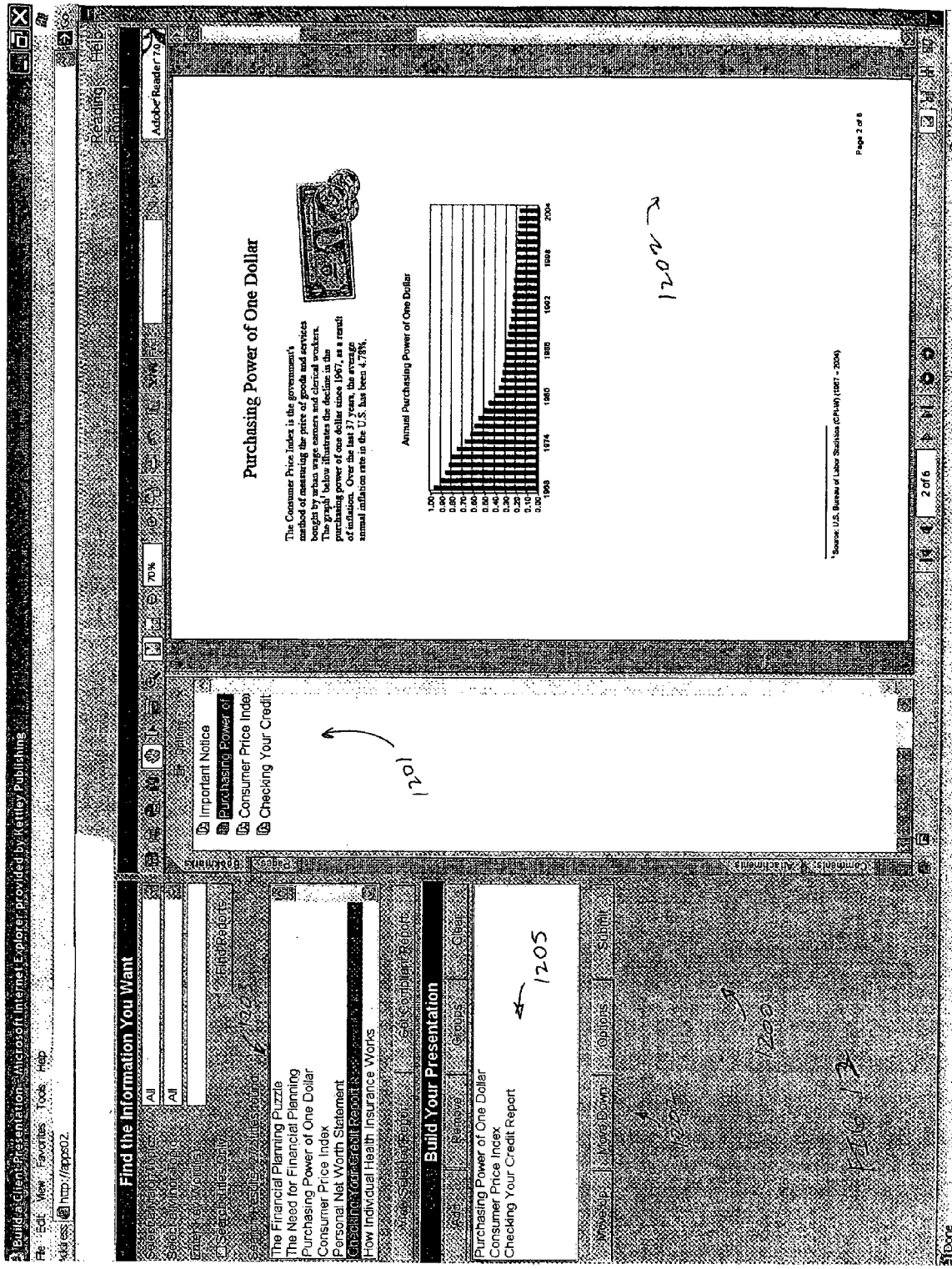
FIG. 12 shows a sample screen for selecting a list of modules to build a document in the example system corresponding to FIG. 9.

FIG. 12 shows a sample screen 1200 for selecting a list of modules to build a document in the example system corresponding to FIG. 9. The screen 1200 includes a list of available modules 1203, a list of requested modules 1205 (the request list), and editing controls 1205 for editing the request list. The list 1203 corresponds to the list generated in connection with FIG. 6 and shows only those modules that the user is allowed to access and that satisfy any search criteria the user has specified. The controls 1202 included buttons to add a module, remove a module, move a module up in the request list, move a module down in the request list, open a document options page, and submit the request list (e.g., produce a document).

The screen 1200 also includes a document list 1201 that shows the documents in the document list (e.g., the list of modules after the construction rules have been applied to the current request list), and a preview area 1202 for previewing modules from the document list.

Figure 13:
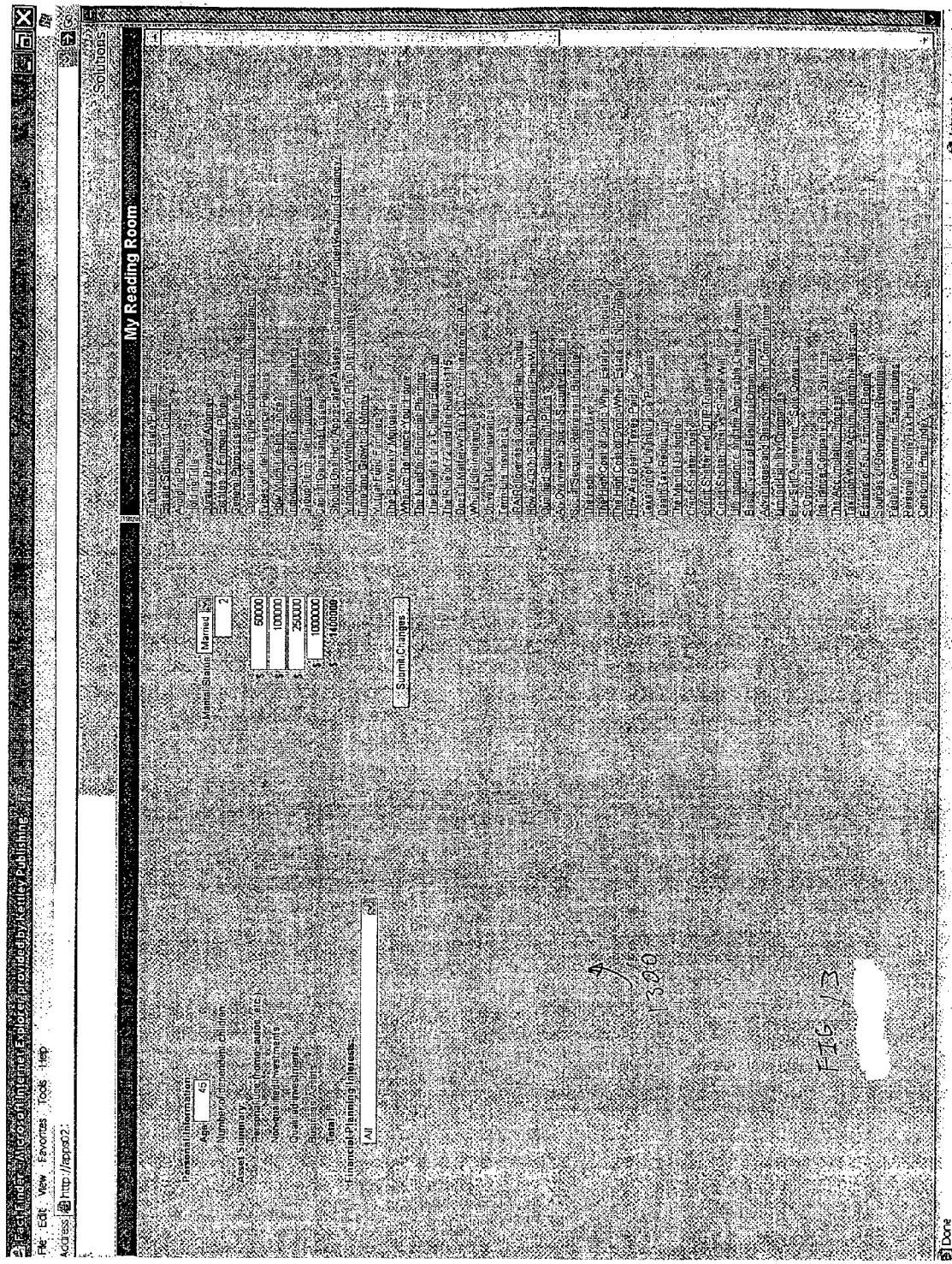
FIG. 13 shows a sample screen for searching for modules in the example system corresponding to FIG. 9.

FIG. 13 shows a sample screen for specifying search criteria such as, for example, age, marital status, number of dependents, asset values, financial planning interests, etc. A list of modules satisfying the search criteria (and the access rules) is also provided.

FIG. 14 shows a sample screen for selecting document options in the example system corresponding to FIG. 9. The document options can include page setup information, such as, for example, border style, header text, footer text, a "print date" checkbox, etc. The document options can also include presentation information, such as, for example, title, client name, agent name, address information, a checkbox to include a table of contents, etc.

Although various embodiments have been described above, other embodiments will be within the skill of one of ordinary skill in the art. Thus, although described in terms of a deaf user, such description was for sake of convenience and not by way of limitation. The invention is limited only by the claims that follow.

What is claimed is:

1. A document management system which includes a processor and memory, the document management system comprising:
   a module database configured to store at least a first module and a second module;
   a search engine configured to allow a user to search for modules in said database according to one or more search rules;
   an access control engine configured to control access to said first and second modules based on different user classes according to one or more access rules;
   a construction engine configured to use one or more of said first and second modules to construct a document according to one or more construction rules so that the document includes content based on the first module and content based on the second module; and a module review engine configured to allow multiple subscribers to review and approve or reject a new version of said first module during a review period, said construction engine configured to use a prior version of said first module for documents assembled by a subscriber until said new version of the first module has been approved by the subscriber, said document assembly system configured to prohibit the subscriber's access to said prior version of the first module after said review period has expired for the subscriber if the subscriber approves the new version of the first module, wherein the approval or rejection of the new version of the first module by the subscriber does not affect the ability of different subscribers to approve or reject the new version of the first module;

the module review engine further configured to allow multiple subscribers to review and approve or reject a new version of said second module during a review period, said construction engine configured to use a prior version of said second module for documents assembled by a subscriber until said new version of the second module has been approved by the subscriber, said document assembly system configured to prohibit the subscriber's access to said prior version of the second module after said review period has expired for the subscriber if the subscriber approves the new version of the second module, wherein the approval or rejection of the new version of the second module by the subscriber does not affect the ability of different subscribers to approve or reject the new version of the second module.

2. The document management system of claim 1, wherein said user classes comprise a supervisor user class.

3. The document management system of claim 1, wherein said user classes comprise a second-level user class.

4. The document management system of claim 1, wherein said user classes comprise a public user class.

5. The document management system of claim 1, further comprising one or more access rules to describe how said first and second modules are combined.

6. The document management system of claim 1, wherein said search rules are configured on a subscriber basis such that each subscriber can define a different set of search rules.

7. The document management system of claim 1, wherein said search rules comprise one or more default search rules.

8. The document management system of claim 1, wherein said construction engine uses said construction rules to modify a user-supplied list of modules to produce a document list as an ordered list of modules to be used to construct said document.

9. The document management system of claim 1, wherein said construction engine adds additional modules to a user-supplied list according to one or more of said construction rules.

10. The document management system of claim 1, wherein said construction engine reorders modules in a user-supplied list according to one or more of said construction rules.

11. The document management system of claim 1, wherein said first module comprises source code.

12. The document management system of claim 1, wherein said first module comprises script code.

13. The document management system of claim 1, wherein said first module comprises CAD files.

14. The document management system of claim 1, wherein said first module comprises executable code that is executed to produce at least a portion of said document.

15. The document management system of claim 1, wherein said first module comprises XML code.

16. The document management system of claim 1, wherein said first module comprises a word-processing file.

17. The document management system of claim 1, wherein said first module comprises document text.

18. The document management system of claim 1, wherein said first module comprises markup language data.

* * * * *